Jan. 28, 1964     H. O. SHORT     3,119,274
POWER-DRIVEN TOOL FOR DRILLING OR IMPACT-DRILLING
Filed June 5, 1961     2 Sheets-Sheet 1
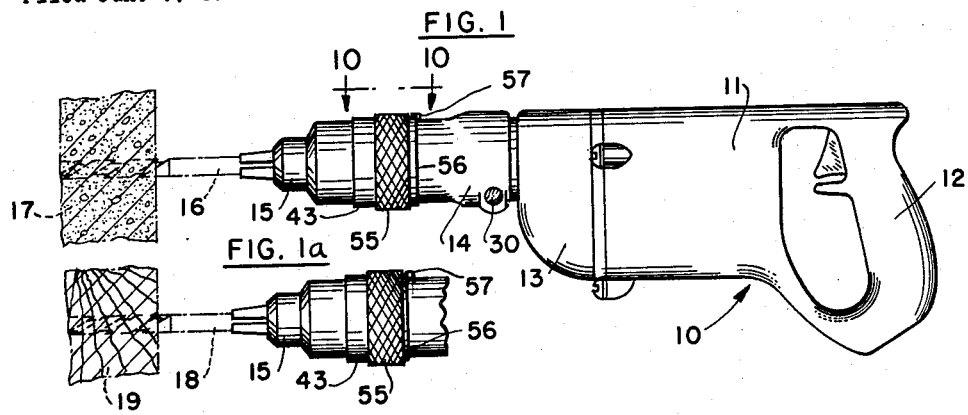
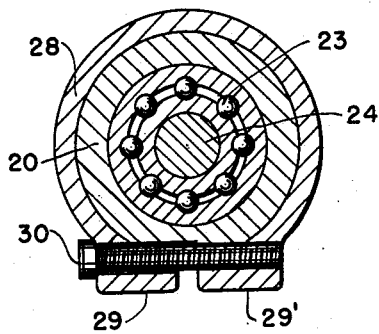
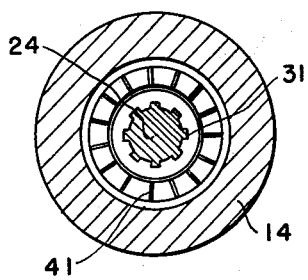
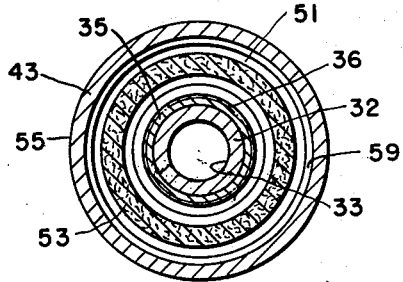
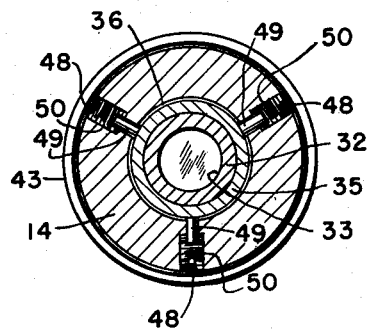
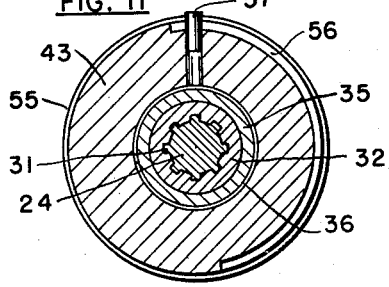
INVENTOR
HAROLD O. SHORT
BY *Leonard Bloom*
ATTORNEY

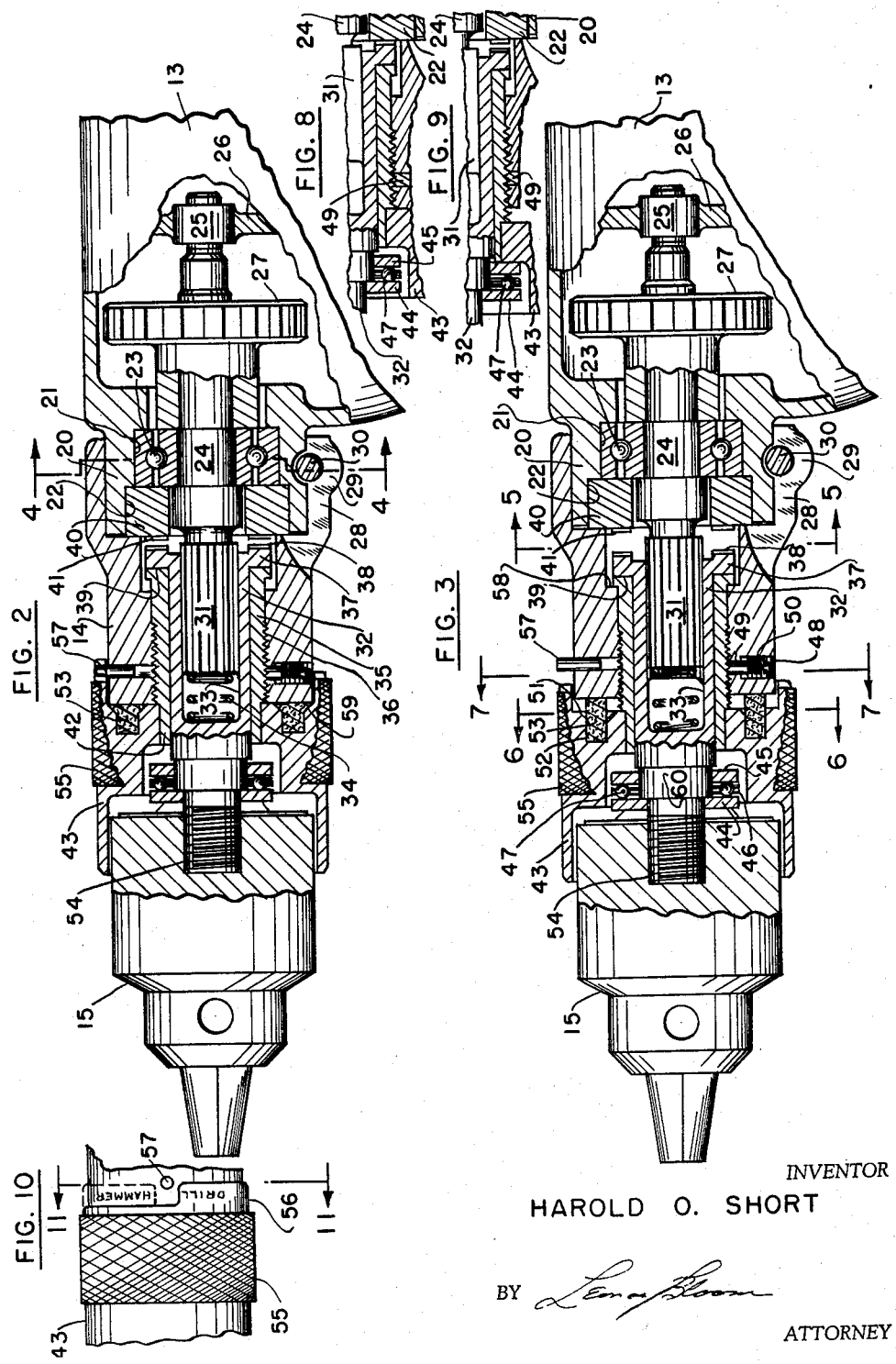

United States Patent Office 3,119,274
Patented Jan. 28, 1964

3,119,274
POWER-DRIVEN TOOL FOR DRILLING OR IMPACT-DRILLING
Harold O. Short, Towson, Md., assignor to The Black and Decker Manufacturing Company, Towson, Md., a corporation of Maryland
Filed June 5, 1961, Ser. No. 114,735
14 Claims. (Cl. 74—22)

The present invention relates to a power-driven tool for drilling and impact-drilling, and more particularly, to such a tool that may be changed from one position to another easily and conveniently.

It is an object of the present invention to provide a power-driven tool for drilling and impact-drilling, wherein the same chuck may be used for either operation, and wherein only the drill bit itself need be changed.

It is another object of the present invention to provide a power-driven tool for drilling and impact-drilling, wherein the overall length of the tool does not prohibit its convenient use for either operation.

It is yet another object of the present invention to provide, in a power-driven tool for drilling and impact-drilling, a spindle bearing sleeve having a threaded engagement with the impact housing, in combination with an externally-accessible adjusting collar secured to the spindle bearing sleeve, whereby the collar may be turned less than a full turn in either direction so as to switch from the "drill" position to the "impact-drill" position, or vice-versa.

It is still another object of the present invention to provide a power-driven tool for drilling and impact-drilling, which may be manufactured easily and conveniently and at a low unit cost.

It is yet still another object of the present invention to provide a power-driven tool for drilling and impact-drilling, which will not be inadvertently shifted in operation, and which is inherently rugged and reliable for long and continuous service.

These and other objects of the present invention will become apparent from a reading of the following specification, taken in conjunction with the enclosed drawings, in which:

FIGURE 1 is a side elevational view of the complete power-driven tool for drilling or impact-drilling, showing the operation of the tool as an impact-drill;

FIGURE 1a is a view corresponding to a portion of FIGURE 1, but showing the operation of the tool in the alternate position as an ordinary power-driven drill;

FIGURE 2 is an enlarged longitudinal section of a portion of FIGURE 1, with parts broken away and sectioned to show the mechanism in the "impact-drill" position;

FIGURE 3 is a view corresponding to that of FIGURE 2, but showing the mechanism in the "drill" position;

FIGURE 4 is a view taken along the lines 4—4 of FIGURE 2, showing the means for detachably mounting the clutch housing to the gear housing;

FIGURE 5 is a view taken along the lines 5—5 of FIGURE 3, showing the spline-to-spline connection between the shaft and spindle, and further showing the circumferentially-spaced notched teeth on the stationary cam element;

FIGURE 6 is a view taken along the lines 6—6 of FIGURE 3, showing the flexible annular sealing ring that is disposed concentrically within the adjusting collar;

FIGURE 7 is a view taken along the lines 7—7 of FIGURE 3, showing the means for preventing an inadvertent shifting of the adjusting collar and the spindle bearing sleeve during the operation of the tool;

FIGURE 8 is a portion of FIGURE 2, but showing the floating spindle retracted with respect to the housing of the tool, such that the corresponding notched surfaces may ratchet or impact against one another;

FIGURE 9 is a view of a portion of FIGURE 3, corresponding to that of FIGURE 8, but showing how the thrust bearing will abut against the spindle bearing sleeve so as to prevent the corresponding notched surfaces from ratcheting or impacting against one another;

FIGURE 10 is a view taken along the lines 10—10 of FIGURE 1, showing a portion of the knurled adjusting collar, the adjustment for the "hammer" position being shown in broken lines for convenience; and FIGURE 11 is a view taken along the lines 11—11 of FIGURE 10, the knurled adjusting collar being shown in the "hammer" position for convenience of illustration.

With particular reference to FIGURE 1, there is illustrated a power-driven tool 10 operable, selectively, for drilling or impact-drilling and including a motor housing 11, switch handle 12, gear case 13, impact housing 14, and chuck 15; and in FIGURE 1, the tool 10 is illustrated in the "impact-drill" position, whereby a conventional masonry drill bit 16 may be used for drilling into concrete 17 or other types of masonry materials.

With particular reference to FIGURE 1a, there is illustrated the alternate or "drill" position of the tool 10, whereby an ordinary twist drill 18 is used to drill holes in a variety of materials, such as the wood workpiece 19.

With particular reference to FIGURES 2 and 3, the gear case 13 has a forwardly-projecting hollow cylindrical portion 20 which is provided with a bore 21 and a counterbore 22, a ball bearing 23 being retained within bore 21 of portion 20 of the gear case 13. A shaft 24 is journaled in ball bearing 23 and also in a suitable bearing 25, the latter bearing 25 being retained in an end wall 26 formed within the gear case 13. Shaft 24 is driven by a suitable gear train; and one of the gears, denoted by 27, is carried by shaft 24. The impact housing 14 is cylindrically formed and has a rearward split clamping portion 28; and with reference to FIGURES 2 and 4, the rearward portion 28 is provided with a pair of aligned bosses 29 and 29', one of which (29') is tapped, and a screw 30 is received between the bosses 29 and 29' so as to detachably clamp the impact housing 14 to the portion 20 of the gear case 13.

With reference to FIGURES 2, 3, 5 and 11, the shaft 24 has a forward portion which is provided with a series of circumferentially-spaced longitudinal splines 31; and a spindle 32 has a blind axial bore 33 so as to receive the splined portion 31 of shaft 24, the spindle 32 being formed with internal circumferentially-spaced longitudinal splines corresponding to splines 31. Thus, the spindle 32 is rotatably driven by the shaft 24 at all times; and by the same token, spindle 32 is allowed to have a free relative axial movement with respect to the shaft 24. Resilient means, such as compression spring 34, is disposed within the remaining portion of the blind axial bore 33, and between the spindle 32 and the shaft 24, so as to constantly urge the spindle 32 outwardly with respect to the impact housing 14.

With reference to FIGURES 2, 3, 5, and 7, a spindle bearing sleeve 35 is disposed between the spindle 32 and the impact housing 14. External threads 36 are formed on spindle bearing sleeve 35 and engage corresponding internal threads formed within the hollow cylindrical impact housing 14. Moreover, the spindle 32 carries a movable cam element comprising a rearward collar portion 37, the latter having a rearward face which is provided with a series of circumferentially-spaced serrated or notched teeth 38, and a forward face 39 which is in abutting engagement with the rearward portion of the spindle bearing sleeve 35. A stationary cam element 40 is press-fitted within the counterbore 22 (in the portion 20 of the gear case 13) and is disposed concentrically about the shaft 24; and the stationary cam element 40 has a forward face which is provided with a series of corresponding circumferentially-spaced serrated or notched teeth 41, it being noted from an examination of FIGURES 2 and 3 that the notched teeth 38 and 41 are in axial alignment with each other. Spindle bearing sleeve 35 has a forward portion 42 projecting beyond impact housing 14, and an externally-accessible adjusting collar 43 is press-fitted to the forward portion 42 of the spindle bearing sleeve 35. Moreover, as shown in FIGURE 3, a thrust bearing, comprising a forward thrust washer 44, a rearward thrust washer 45, a ball retainer 46, and balls 47, is mounted upon the spindle 32 between the chuck 15 and the spindle bearing sleeve 35, the latter having the adjusting collar 43 integral therewith. Forward thrust washer 44 is press-fitted to spindle 32 (against shoulder 60), while rearward thrust washer 45 is loosely mounted on spindle 32.

Accordingly, it will be appreciated that the adjusting collar 43, which may be considered as integral with the spindle bearing sleeve 35, may be turned in either direction by the operator so as to advance or retract the externally-threaded spindle bearing sleeve 35 with respect to the impact housing 14, and hence, to respectively advance of retract the floating spindle 32 with respect to the impact housing 14; and as a result, the axial spacing between the corresponding notched teeth 38 and 41 may be varied by the operator.

With reference to FIGURES 2 and 8, which show the mechanism in the "impact-drill" or "hammer-drill" position, the adjusting collar 43 has been turned so that the spindle bearing sleeve 35 has been retracted within the impact housing 14, decreasing the axial spacing between the corresponding notched teeth 38 and 41; and when the operator exerts forward pressure on the overall housing for the tool 10, the floating spindle 32 will be further retracted within the impact housing 14, such that the corresponding notched teeth 38 and 41 will ratchet or impact against each other as shown in FIGURE 8, as the spindle 32 (and in turn the masonry drill bit 16) are being constantly rotated. The result is such that the masonry drill bit 16 is both rotated and is experiencing a vibrational impact which shakes the dust and grit particles loose so as to enable a more efficient drilling in the concrete 17.

With reference to FIGURES 1a, 3, and 9, which show the mechanism in the ordinary drill position, the adjusting collar 43 has been turned so as to advance the spindle bearing sleeve 35 outwardly with respect to the impact housing 14 such that sleeve 35 abuts against an internal shoulder 58 formed within impact housing 14, thereby increasing the axial spacing between the corresponding impact teeth 38 and 41; and as shown more particularly in FIGURE 9, when forward pressure is again exerted by the operator on the tool 10, the thrust bearing, and more particularly the rearward thrust washer 45 thereof, will abut against the spindle bearing sleeve 35 (and the portion of the adjusting collar 43 secured thereto) so as to preclude the corresponding notched teeth 38 and 41 from contacting or impacting or ratcheting against each other. Hence, the mechanism is operated as a conventional drill with no vibrational or other impacts being experienced by the twist drill 18.

With reference to FIGURES 2, 3, and 7, the impact housing 14 is provided with a series (preferably three) of circumferentially-spaced threaded radial bores 48, each of which terminate adjacent to the threaded portion 36 of the spindle bearing sleeve 35; and a pellet 49 of nylon or similar material, backed by a set screw 50, is disposed within each of the radial bores 48 and is tightened against the external threads 36 of the spindle bearing sleeve 35 to the extent of approximately 10 inch pounds of torque. Thus, the spindle bearing sleeve 35 (as well as the adjusting collar 43) are precluded from a maladjustment or inadvertent shifting, as may otherwise be caused by the drilling operation, or especially by the impact-drilling operation. However, it will be appreciated that the degree of tightness exerted by the pellets 49, while sufficient to preclude an inadvertent adjustment from one position to another in the actual operation of the tool 10, still allows for an easy manual manipulation of the adjusting collar 43.

With reference to FIGURES 2, 3, and 6, the adjusting collar 43 has a rearward portion including a rearward face 51 and further including an internal annular groove 52 formed therein; and a flexible annular sealing ring (such as fibre ring 53) is fitted within the annular groove 52 and projects rearwardly of the rearward face 51 of the adjusting collar 43 so as to abut internally against the impact housing 14. Thus, a grease seal, as well as a dirt or dust seal, is provided for the overall mechanism; and the fibre ring 53, being in a sense compressible, may be squeezed down against the impact housing 14 in the impact-drill position. As shown more particularly in FIGURE 2, an annular taper may be provided on the annular groove 52 so as ot accommodate the compressing of ring 53.

With reference again to FIGURES 2 and 3, the shaft 24 is provided with a threaded forward portion 54, so as to receive a conventional chuck 15; and as previously related, the same chuck 15 may be used for the impact-drilling position as well as for the ordinary drilling position, and only the particular bit itself need be changed.

With reference to FIGURES 10 and 11, the adjusting collar 43 has a knurled portion 55 and further has a rearwardly-extending portion 56 (substantially semi-annular); and a fixed indicating pin 57 is carried by the impact housing 14, intermediately of the rearward portion 56 of the adjusting collar 43, such that the operator will be readily informed as to the direction in which the adjusting collar 43 must be turned in order to switch from one position to another. Also, suitable indications such as "drill" and "hammer" may be placed on the rearward portion 56 of the adjusting collar 43 so as to indicate to the operator the position in which the mechanism is adjusted; and it will be appreciated that adjusting collar 43 need only be turned less than a complete revolution to switch from one position to another.

Obviously, many modifications may be made without departing from the basic spirit of the present invention; and therefore, within the scope of the appended claims, the invention may be practiced other than has been specifically described.

I claim:

1. A power-driven tool for drilling or impact-drilling comprising a housing, a shaft journaled for rotation in said housing, power-driven means to rotate said shaft, said shaft having a forward portion, a spindle having a blind axial bore, said forward portion of said shaft being received within said blind axial bore of said spindle, means interconnecting said spindle and said shaft, whereby said spindle is constantly rotated by said shaft, and whereby said spindle is free to move axially with respect to said shaft, a stataionary cam element retained in said housing concentrically about said shaft and rearwardly of said spindle, said stationary cam element including a forward face having a first series of circumferentially-spaced notched teeth formed thereon, said spindle including a rearward collar portion having both forward face and a rearward face, a second series of circumferentially-spaced notched teeth formed on said rearward face of said collar portion and axially aligned with said notched teeth on said stationary cam element, a spindle bearing sleeve between said spindle and said housing and abutting against said forward face of said collar portion of said spindle, said spindle bearing sleeve having a threaded engagement with said housing, externally-accessible means to selectively rotate said spindle bearing sleeve into and out of said housing, thereby varying the axial spacing between said first and second series of notched teeth, resilient means urging said spindle out of said housing, and a thrust bearing mounted on said spindle forwardly of said spindle bearing sleeve, whereby in the impact-drilling position said first and second series of notches teeth impact against each other, and whereby in the drill position said thrust bearing abuts against said spindle bearing to preclude said notched teeth from abutting together.

2. A power-driven tool according to claim 1, wherein said means interconnecting said spindle and shaft comprises series of circumferentially-spaced longitudinal splines formed on said forward portion of said shaft, and a corresponding series of circumferentially-spaced longitudinal splines formed in said blind axial bore of said spindle.

3. A power-driven tool according to claim 1, wherein said spindle bearing sleeve has a forward portion protruding beyond said housing, and wherein said externally-accessible means comprises an adjusting collar secured to said forward portion of said spindle bearing sleeve, said adjusting collar having a knurled portion to facilitate a manual manipulation.

4. A power-driven tool according to claim 3, wherein said adjusting collar has a semi-annular rearwardly-extending portion, and wherein a protruding indicating pin is carried by said housing intermediate said rearwardly-extending portion, whereby said adjusting collar need be turned less than a complete revolution, and whereby said pin presents a visual indication of the direction in which said adjusting collar must be rotated to switch from one position to another.

5. A power-driven tool according to claim 1, wherein said resilient means comprises a compression spring disposed within said blind axial bore of said spindle and between said spindle and said forwardly-protruding portion of said shaft.

6. A power-driven tool according to claim 1, wherein said housing comprises a gear housing having a protruding cylindrical portion, a hollow cylindrical impact housing having a rearward split clamping portion including a pair of aligned bosses, one of which is tapped, and a clamping screw passing between said bosses, whereby said protruding cylindrical portion of said gear housing is received within said rearward portion of said impact housing, and whereby said screw may be tightened in said bosses to clamp said impact housing to said gear housing.

7. A power-driven tool according to claim 6, wherein said hollow cylindrical impact housing is provided with internal threads, said spindle bearing sleeve being provided with corresponding external threads to engage said internal threads in said impact housing, and wherein said impact housing has a plurality of circumferentially-spaced radial bores terminating at said internal threads, each of said bores being threaded, an anti-friction pellet in each of said bores, each of said pellets being backed by a set screw in said respective bore, whereby said pellets may be tightened against said external threads of said spindle bearing sleeve, thereby to prevent said spindle bearing sleeve from being inadvertently adjusted from one position to another, and whereby said pellets may be overridden by a manual adjustment of said adjusting collar.

8. A power-driven tool according to claim 1, wherein said adjusting collar has a rearward portion terminating in a rearward face, said rearward portion having an annular groove formed therein concentrically to said spindle, said groove having an outward portion formed with an annular taper, and wherein a compressible annular sealing washer is received within said annular groove and has a portion protruding rearwardly beyond said rearward face of said adjusting collar to engage said housing.

9. A power-driven tool according to claim 1, wherein said spindle has a forwardly-projecting threaded portion, and wherein a chuck is threadably secured to said portion of said spindle, whereby said chuck may be used both for drilling and impact-drilling.

10. A power-driven tool according to claim 9, wherein said thrust bearing comprises a forward thrust washer, a shoulder on said spindle, said forward thrust washer being press-fitted upon said spindle adjacent said shoulder, whereby said chuck will abut against said forward thrust washer, a rearward thrust washer loosely disposed on said spindle, a ball retainer between said thrust washers, and anti-friction balls in said ball retainer.

11. In a power-driven tool for drilling or impact-drilling, the combination of a housing having a bore, a spindle bearing sleeve received in said bore and being provided with an external thread, whereby said spindle bearing sleeve may be axially advanced or retracted with respect to said housing, means to preclude said spindle bearing sleeve from being entirely withdrawn from said housing, an axially-floating spindle journaled in said spindle bearing sleeve and having a portion protruding externally of said housing, means to rotatably drive said spindle, said spindle bearing sleeve having a front end portion external to said housing, and said spindle bearing sleeve further having a rearward end portion disposed within said housing, said spindle having a rearward portion seated upon said rearward end portion of said spindle bearing sleeve, whereby said spindle is retracted within said housing whenever said spindle bearing sleeve is retracted within said housing, means to constantly urge said spindle against said rearward end portion of said spindle bearing sleeve, whereby said spindle is advanced whenever said spindle bearing sleeve is advanced with respect to said housing, a movable cam element carried by said spindle and projecting rearwardly of said rearward portion of said spindle, a stationary cam element retained in said housing rearwardly of said movable cam element, and thrust bearing means carried by said protruding portion of said spindle, whereby, in a retracted position of said spindle bearing sleeve and said spindle, said cam elements repeatedly engage each other as said spindle is being rotatably driven, and whereby, in an advanced position of said spindle bearing sleeve and said spindle, said thrust bearing means abuts against said front end portion of said spindle bearing sleeve to preclude said cam elements from engaging each other as said spindle is being rotatably driven.

12. In a power-driven tool for drilling or impact-drilling, the combination of a housing having a bore, a spindle bearing sleeve received within said bore, means for advancing or retracting said spindle bearing sleeve with respect to said housing, said means including an adjusting collar secured to said spindle bearing sleeve externally of said housing, means to preclude said spindle bearing sleeve from being entirely withdrawn from said housing, an axially-floating spindle journaled in said spindle bearing sleeve and having a portion protruding externally of said housing beyond said adjusting collar, a chuck mounted upon said protruding portion of said spindle, thrust bearing means carried by said protruding portion of said spindle intermediate said chuck and said adjusting collar, means to rotatably drive said spindle, said spindle bearing sleeve having a rearward end portion disposed within said housing, and said spindle having a rearward portion seated upon said rearward end portion of said spindle bearing sleeve, whereby said spindle is retracted within said housing whenever said spindle bearing sleeve is retracted within said housing, means to constantly urge said spindle against said rearward end portion of said spindle bearing sleeve, whereby said spindle is advanced whenever said spindle bearing sleeve is advanced with respect to said housing, movable cam means carried by said spindle, and stationary cam means retained in said housing rearwardly of said movable cam means, whereby, in a retracted position of said spindle bearing sleeve and said spindle, said cam means repeatedly engage each other as said spindle is being rotatably driven, and whereby, in an advanced position of said spindle bearing sleeve and said spindle, said thrust bearing means abuts against said collar to preclude said cam means from engaging each other as said spindle is being rotatably driven.

13. In a power-driven tool for drilling or impact-drilling, the combination of a housing, an axially-floating spindle journaled in said housing and having a portion protruding beyond said housing, thrust bearing means carried by said protruding portion of said spindle, said spindle having a blind axial bore which opens rearwardly of said spindle, a rotating shaft journaled in said housing and having a portion received in said bore of said spindle, means forming a series of internal longitudinal splines within said bore of said spindle, means forming a co-operating series of external longitudinal splines on said portion of said shaft which is received in said spindle, whereby said shaft and said spindle rotate in unison, and whereby said spindle may have an axial sliding movement with respect to said shaft, resilient means in said bore of said spindle, between said spindle and said shaft, whereby said spindle is constantly urged outwardly of said housing, externally-accessible axially-adjustable abutment means carried by said housing and limiting the axial advance of said spindle outwardly of said housing, said abutment means also engaging said spindle to retract said spindle within said housing in response to the axial retraction of said abutment means, movable cam means carried by said spindle and projecting rearwardly of said spindle, and stationary cam means retained within said housing rearwardly of said movable cam means, whereby, in a retracted position of said spindle, said cam means repeatedly engage each other as said spindle is being rotatably driven by said shaft, and whereby, in an advanced position of said spindle, said thrust bearing abuts against said abutment means to preclude said cam means from engaging each other as said spindle is being rotatably driven.

14. In a power-driven tool for drilling or impact-drilling, the combination of a housing, an impact housing detachably secured to said housing forwardly thereof, an axially-floating spindle journaled in said impact housing and having a portion protruding forwardly thereof, thrust bearing means carried by said protruding portion of said spindle, said spindle having a blind axial bore which opens rearwardly of said spindle, a rotating shaft journaled in said housing and protruding forwardly within said impact housing to be received in said bore of said spindle, coupling means operative between said spindle and said shaft, whereby said spindle and said shaft rotate in unison, and whereby said spindle may have a relative axial movement with respect to said shaft, resilient means in said bore of said spindle, between said spindle and said shaft, whereby said spindle is constantly urged outwardly of said impact housing, externally-accessible axially-adjustable abutment means carried by said housing and limiting the axial advance of said spindle outwardly of said housing, said abutment means also engaging said spindle to retract said spindle within said housing in response to the axial retraction of said abutment means, movable cam means carried by said spindle and projecting rearwardly of said spindle, and stationary cam means retained within said housing rearwardly of said movable cam means, whereby, in a retracted posititon of said spindle, said cam means repeatedly engage each other as said spindle is being rotatably driven by said shaft, and whereby, in an advanced position of said spindle, said thrust bearing abuts against said abutment means to preclude said cam means from engaging each other as said spindle is being rotatably driven.

References Cited in the file of this patent
UNITED STATES PATENTS

| | | |
|---|---|---|
| 2,780,106 | Lovequist | Feb. 5, 1957 |
| 2,968,960 | Fulop | Jan. 24, 1961 |
| 3,000,225 | Taylor | Sept. 19, 1961 |